US012157130B2

(12) United States Patent
Chapelier et al.

(10) Patent No.: US 12,157,130 B2

(45) Date of Patent: Dec. 3, 2024

(54) REFILLABLE PACKAGING ASSEMBLY FOR A COSMETIC PRODUCT

(71) Applicant: Parfums Christian Dior, Paris (FR)

(72) Inventors: Thierry Chapelier, Colombes (FR); David Bieuzen, Paris (FR)

(73) Assignee: Parfums Christian Dior (FR)

( * ) Notice: Subject to any disclaimer, the term of this patent is extended or adjusted under 35 U.S.C. 154(b) by 0 days.

(21) Appl. No.: 17/782,470

(22) PCT Filed: Nov. 30, 2020

(86) PCT No.: PCT/FR2020/052229

§ 371 (c)(1),
(2) Date: Jun. 3, 2022

(87) PCT Pub. No.: WO2021/111070

PCT Pub. Date: Jun. 10, 2021

(65) Prior Publication Data

US 2023/0001435 A1 Jan. 5, 2023

(30) Foreign Application Priority Data

Dec. 5, 2019 (FR) ...................................... 1913787

(51) Int. Cl.
*B05B 11/00* (2023.01)
*A45D 34/04* (2006.01)
*B05B 11/10* (2023.01)

(52) U.S. Cl.
CPC .......... *B05B 11/0032* (2013.01); *A45D 34/04* (2013.01); *B05B 11/1047* (2023.01)

(58) Field of Classification Search
CPC . B05B 11/0032; B05B 11/1047; A45D 34/04; A45D 40/26; A45D 2034/002; A45D 2040/0006
See application file for complete search history.

(56) References Cited

U.S. PATENT DOCUMENTS 4,144,983 A 3/1979 Pauls et al.
5,568,886 A * 10/1996 Knickerbocker ... B05B 11/1018 222/542

(Continued)

FOREIGN PATENT DOCUMENTS

DE 8620794 U1 9/1986
EP 3670000 A1 6/2020

(Continued)

OTHER PUBLICATIONS

French Search Report of French Application Serial No. 1913787 dated Aug. 19, 2020, 1 page.

(Continued)

*Primary Examiner* — Vishal Pancholi

(74) *Attorney, Agent, or Firm* — Lippes Mathias LLP

(57) ABSTRACT

A packaging assembly for a cosmetic product has a receptacle which can contain the product, and an insert which supports a dispensing member and is removably mounted on the receptacle in order to allow, when it is mounted on the receptacle, product to be dispensed by the dispensing member. The insert is configured to cooperate with the receptacle so that, when the receptacle is moved to be mounted on and/or removed from the insert, the insert successively moves via a first position in which the force necessary for the movement reaches a first local maximum, and a second position in which the force reaches a second local maximum.

12 Claims, 5 Drawing Sheets

(56) References Cited

U.S. PATENT DOCUMENTS

| | | | | |
|---|---|---|---|---|
| 6,349,856 | B1 * | 2/2002 | Chastel | B05B 11/1047 222/321.7 |
| 2014/0131392 | A1 | 5/2014 | Beranger et al. | |
| 2019/0193099 | A1 | 6/2019 | Ding | |
| 2020/0197964 | A1 * | 6/2020 | Dumont | B05B 11/1049 |

FOREIGN PATENT DOCUMENTS

| | | | |
|---|---|---|---|
| JP | 2003237810 | A | 8/2003 |
| JP | 2017047909 | A | 3/2017 |
| JP | 2018140797 | A | 9/2018 |
| WO | WO 99/11387 | | 3/1999 |
| WO | 2014033495 | A1 | 3/2014 |

OTHER PUBLICATIONS

International Search Report of International Application Serial No. PCT/FR2020/052229 dated Mar. 23, 2021 and English translation, 6 pages.

International Preliminary Report on Patentability and Written Opinion of International Application No. PCT/FR2020/052229 dated May 17, 2022 (and English Translation), 16 pages.

* cited by examiner

REFILLABLE PACKAGING ASSEMBLY FOR A COSMETIC PRODUCT

BACKGROUND OF THE DISCLOSURE

The present disclosure relates to the field of packaging solid, liquid or pasty products, and more particularly to a refillable packaging assembly able to contain such a product. This packaging assembly finds its application for example in the field of cosmetics.

STATE OF THE ART

In cosmetics, the packaging is an important aspect of the value that the user attributes to a product. Thus, manufacturers pay particular attention to the packaging assemblies and containers that contain the products.

In an ecological as well as economical approach, users would like to be able to refill their cosmetic product container when it is empty, rather than throwing away the packaging assembly. There is therefore a need for a new type of packaging assembly for cosmetic products.

SUMMARY OF THE DISCLOSURE

To this end, the present disclosure relates to a packaging assembly for a cosmetic product, comprising a container able to contain said product, and an insert carrying a dispensing member and dismountably mounted on the container to allow, when it is mounted on the container, the dispensing of product by the dispensing member, in which the insert is configured to cooperate with the container so that during the movement of mounting and/or dismounting of the insert on/from the container, the insert passes successively through a first position in which the force required for said movement reaches a first local maximum, and a second position in which said force reaches a second local maximum.

The dispensing member allows the dispensing of the cosmetic product when it is mounted on the container. Thus, the cosmetic product can pass through the dispensing member, which is for example of the pump or valve type.

The first and second positions may be intermediate positions in the movement, that is to say positions which are neither at the start nor at the end of the movement of mounting/dismounting of the insert on/from the container. In other words, the dismounting movement may start before the first position and continue after the second position, and vice versa for the mounting movement. In the present disclosure, the abbreviation mounting/dismounting means mounting and/or dismounting, that is to say also at least one of the mounting and of the dismounting.

The force required for the movement is to be understood in the broad sense and encompasses, in the case of a rotation typically, the notion of torque.

By definition of a local maximum, the force required for said movement is, just before and just after the first position, smaller than the force required for said movement exactly at the first position. In other words, at the first position, the user feels a hard spot, a resistance, whose overcoming requires a locally increased force. The same applies for the second position, it being understood that the first local maximum and the second local maximum may have the same value or different values.

Thanks to the fact that the insert is dismountably mounted on the container and that the movement of its mounting/dismounting on/from the container requires passing the two aforementioned local maxima, the user can dismount and remount the insert as desired for refilling the container, while ensuring, thanks to the two hard spots, a satisfactory closing of the packaging assembly, both objectively and subjectively for the user.

In some embodiments, one element among the insert and the container induces on the other element among the insert and the container an elastic deformation when passing the first position and the second position. A local maximum force may correspond to a local maximum deformation of said other element. The elastic deformation makes it easy to achieve the local maximum force while ensuring the reversibility of the mounting and the dismounting.

In some embodiments, in the first position, a notch of the insert cooperates with a boss of the container, and in the second position, said notch or another notch of the insert cooperates with said boss or another boss of the container. Several variants can be envisaged, among which: the insert comprises at least one notch and the container comprises at least two bosses, the notch successively cooperating with each of the bosses, or the insert comprises at least two notches and the container comprises at least one boss, the boss cooperating successively with each of the notches, or the insert comprises at least two notches and the container comprises at least two bosses, one of the notches cooperating with one of the bosses then the other notch cooperating with the other boss.

For reasons of brevity but without loss of generality, it will be assumed hereafter that the insert comprises a notch and the container comprises two bosses, but all the detailed properties concerning the notches and the bosses can be transposed to the other configurations.

Each notch-boss pair may further be duplicated, for example to ensure a good distribution of the forces and a symmetrical and balanced feeling for the user. For example, the insert may comprise at least two notches, for example five (or any number of) distributed notches, each of these notches cooperating with a first boss in the first position and a second boss in the second position. There are therefore five notch-boss pairs in the first position and five notch-boss pairs in the second position, even if, for reasons of brevity, only one notch, a first boss and a second boss are described. It should be noted, moreover, that some first bosses may coincide with some second bosses; for example, the first boss cooperating with a notch in the first position may act as a second boss cooperating with another notch in the second position.

The notches and bosses may refer to projections or protrusions of any kind, including tab-type elements.

Saying that a notch and a boss cooperate means that they are mutually bearing against each other, for example in the direction of the mounting/dismounting movement. For example, when said movement comprises a rotation, a notch and a boss may bear against each other in the circumferential direction, possibly so as to cause radial deformation of the insert.

In some embodiments, each said notch of the insert projects towards the container and each said boss of the container projects towards the insert.

In some embodiments, the container comprises a threading for the mounting of the insert, the boss or bosses being provided on an annular bead located on one side of the threading. For example, the bead may have a variable thickness forming the bosses. The bead may further have local recesses. The bead facilitates the manufacture of the bosses.

In some embodiments, the insert has a tubular wall from which the notch projects, the wall having a reference thickness on a portion relatively away from the notch and a thinned thickness compared to the reference thickness on a portion relatively close to the notch. In other words, the thickness of the wall is thinned in the vicinity of the notch. The deformation of the insert in the vicinity of the notch is thus facilitated and the deformation induced on portions of the insert relatively away from the notch is limited. The resistance of the insert to numerous mounting/dismounting movements is therefore improved.

In some embodiments, the insert has a generally annular shape including a flat from which the notch projects. The notch may project inwardly or outwardly of the insert. A flat designates a rectilinear, relatively flattened or planar, portion which may be possibly provided along a chord of the general annular shape, that is to say along a line segment passing inside the general annular shape. In these embodiments, the presence of the flat leaves a space in which the insert can deform, in this case in the vicinity of the notch, which facilitates the deformation of the insert and therefore the mounting/dismounting movement. The interaction between the insert and the other parts is thereby also limited, which further contributes to the longevity of the packaging assembly.

In some embodiments, the container has a neck defining an opening and the insert is configured to be mounted on the neck of the container.

In some embodiments, the movement of mounting and/or dismounting of the insert on/from the container comprises a rotation of the insert relative to the container and the first position is located at 90° or less from the second position. Thus, the successive bosses (and/or the successive notches, as applicable) corresponding to the first position and to the second position are arranged at an angular distance of 90° or less. The angle of 90° or less may be measured about the axis which serves as axis of rotation for the rotational movement of the insert relative to the container.

Furthermore, the mounting/dismounting movement may comprise, in addition to the aforementioned rotation, a translation of the insert relative to the container. The translation may be concomitant with the rotation, typically in the case of a helical movement, for example when the insert and the container cooperate by a threading. Alternatively, the translation may occur before or after the rotation, typically in the case of a bayonet-type movement.

In some embodiments, the packaging assembly further comprises a masking hoop assembled to the insert. The masking hoop may be provided for essentially aesthetic reasons and be assembled to the insert by means known per se, typically clamping, bonding, hooping, crimping, etc.

In some embodiments, the masking hoop has, at one end, a rounded portion configured to come into contact with the container. The fact that a rounded portion of the masking hoop comes into contact with the container allows effectively hiding the insert while ensuring a soft contact between the hoop and the container, this soft contact limiting the wear of the container during the mounting/dismounting movement. In other words, at said end, the portion configured to come into contact with the container is devoid of sharp ridge which would otherwise risk scratching the container or damaging the decoration provided on the container, a fortiori given the relatively frequent mounting/dismounting that such a packaging assembly is intended to undergo. In addition, the fact that a portion is rounded can provide the end with a certain elasticity that allows it to accommodate any possible mounting clearances.

In some embodiments, the packaging assembly further comprises a gasket configured to be compressed during the mounting of the insert on the container. The gasket may be mounted between the insert and the container. The gasket may be compressed when the insert is beyond the second position, even possibly when the insert is between the first position and the second position.

In some embodiments, the insert may be made of polymer, for example polypropylene. Independently, in some embodiments, the container may be made of transparent or translucent material, for example glass. It is noted that the aforementioned elastic deformation is preferably provided to occur at least on the most elastic element among the insert and the container.

BRIEF DESCRIPTION OF THE DRAWINGS

Other characteristics and advantages of the object of the present disclosure will emerge from the following description of embodiments, given by way of non-limiting examples, with reference to the appended figures.

DETAILED DESCRIPTION OF THE PREFERRED EMBODIMENTS

Figure 1:
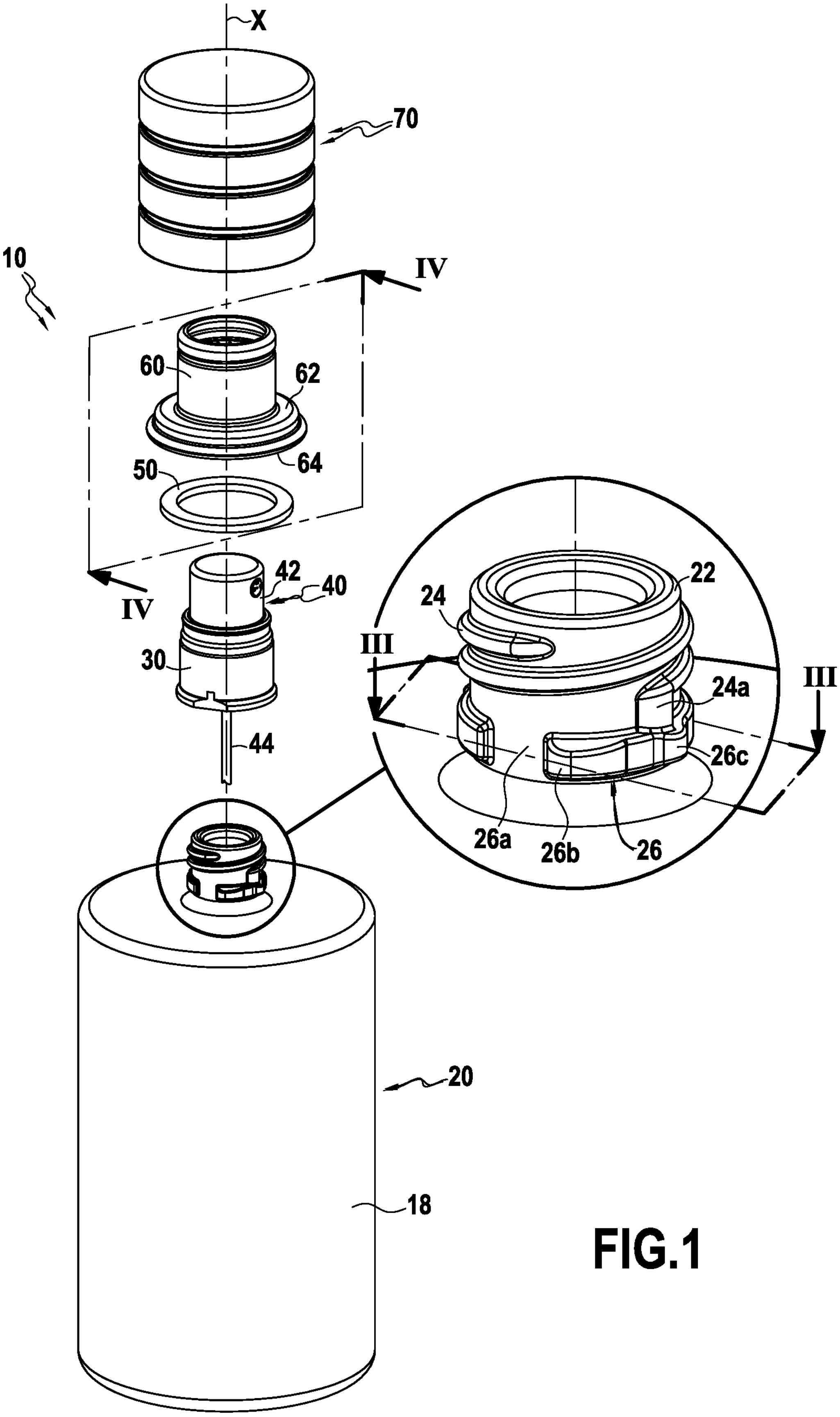
FIG. 1 is an exploded perspective view of a packaging assembly according to one embodiment.

A packaging assembly 10 according to one embodiment is presented with reference to FIGS. 1 to 4. The packaging assembly 10 comprises a container 20 able to contain a cosmetic product, such as a liquid, pasty or powdery product. In this case, the container 20 is of the bottle type, comprising a body 18 and a neck 22 projecting from the body and defining an opening. The container may be made of glass or any other desired material. The body 18 may have decorative patterns such as colors, reliefs, inscriptions, etc.

The opening of the neck 22 extends about an axis X defining an axial direction. A radial direction is a direction perpendicular to this axis and intersecting this axis. Similarly, an axial plane is a plane containing the axis of the opening X and a radial plane is a plane perpendicular to this axis. A circumference is understood as a circle belonging to a radial plane and whose center belongs to the axis X. A tangential or circumferential direction is a direction tangent to a circumference; it is perpendicular to the axis X but does not pass through the axis.

Furthermore, the packaging assembly 10 comprises an insert 30 carrying a dispensing member 40. The insert 30 forms an interface for assembling the dispensing member 40 to the container 20. In this case, the insert 30 is dismountably mounted on the container 20, and more particularly here on the neck 22. The dispensing member 40 may be assembled to the insert 30 by means known per se, for example by bonding, crimping, etc. Alternatively, the insert 30 may form a part of the dispensing member 40, for example by being integrally formed with a pump body or the like.

The dispensing member 40, here of the pump type known per se, may comprise a dispensing head 42 and a dip tube 44. Thus, in this embodiment, the insert 30 supports a pump body. More generally, when the insert 30 is mounted on the container 20, the dispensing member 40 allows the dispensing of the product contained in the container 20, in this case by pressure on the dispensing head 42. As illustrated more particularly in FIG. 2, a gasket 46 such as a flat ring gasket may be mounted on the insert 30 or, as represented, on the dispensing member 40. The gasket 46 is configured to be compressed during the mounting of the insert 30 on the container 20, in this case between the distal end of the neck 22 and the dispensing member 40.

Furthermore, the packaging assembly may comprise a masking hoop 60, optionally provided with a magnet 50, and, independently, a cap or cover 70. These elements will be described later.

The detail of FIG. 1 more particularly illustrates the structure of the neck 22. The container 20, and more particularly the neck 22, has a threading 24 for the mounting of the insert 30. The threading 24 ends with a thread end stop 24*a*. The thread end stop projects transversely to the threading 24. The threading 24 projects radially outwardly and is configured to cooperate with a corresponding threading 34 provided on the insert 30, projecting radially inwardly (see FIG. 2). Thus, the insert 30 can be mounted on/dismounted from the container 20 by screwing using the threadings 24, 34. However, other methods of mounting/dismounting between the insert 30 and the container 20 are envisaged.

Furthermore, the container 20 has at least one boss, here a plurality of bosses, more specifically two pairs of bosses 26*b*, 26*c*. The respective bosses 26*b*, 26*c* of each pair are diametrically opposite in this case. Thus, the neck may be symmetrical by a 180° rotation, that is to say have an invariance by a 2-fold rotation (because) 360°=2×180°. More generally, the neck may have an invariance by an N-fold rotation greater than or equal to 2. As indicated above, only one boss of each pair will be described below.

The bosses 26*b*, 26*c* may project radially outwardly, and are here provided on the neck 22, on one side of the threading 24, in this case on the side of the threading 24 opposite to the opening formed by the neck 22. The bosses 26*b*, 26*c* may project radially beyond the threading 24.

As illustrated in FIG. 1, the bosses 26*b*, 26*c* may be formed by a bead 26, for example a bead of variable thickness. The bead 26 may be annular about the axis X, it being understood that it can comprise recesses 26*a*. Thus, as indicated previously, the bosses 26*b*, 26*c* may be provided on an annular bead 26 located on one side of the threading 24. In this case, the bead 26 adjoins the thread end stop 24*a*, opposite the threading 24.

Figure 2:
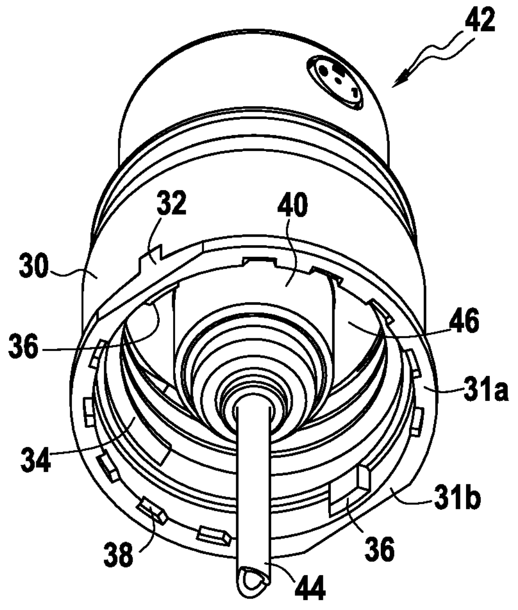
FIG. 2 is a bottom perspective view of an insert according to one embodiment.

FIG. 2 more particularly represents the insert 30 and the dispensing member 40. In this embodiment, the insert 30 has a generally annular shape about the axis X. The insert may comprise one or several notches 36, in this case here a pair of diametrically opposite notches 36. Thus, the insert has an invariance by an N-fold rotation greater than or equal to 2, here N=2. As indicated previously, only one notch 36 will be described below. The notch 36 projects inwardly of the insert 30, that is to say towards the bosses 26*b*, 26*c* which, in turn, project towards the notch 36. The notch 36 may include chamfered edges, at least as regards the edges in the circumferential direction, to facilitate its cooperation with the bosses 26*b*, 26*c*.

In this embodiment, the wall of the insert 30 is truncated, radially outside, in line with the notch 36. Accordingly, the insert has a flat 32 from which the notch 36 projects. Furthermore, this also has the consequence that the tubular wall of the insert 30, from which the notch 36 projects, may have a reduced thickness in the vicinity of the notch 36: said wall has a reference radial thickness on a portion 31*a* relatively away from the notch 36 and a thinned radial thickness compared to the reference thickness on a portion 31*b* relatively close to the notch 36.

The insert 30 may be made of plastic material, for example polypropylene. To facilitate its manufacture, the insert 30 may comprise molding castellations 38.

The outer diameter of the threading 24 of the container may be smaller than the inner diameter of the notches 36, so that the notches 36 do not cooperate with the threading 24 when the insert 30 is mounted on the container 20. During the mounting/dismounting (here screwing/unscrewing) of the insert 30 on the container 20, the notches 36 cooperate with the bosses 26*b*, 26*c* according to one example which will be described with reference to FIGS. 3A-3E. In this case, FIGS. 3A-3E represent a dismounting movement between the insert 30 and the container 20, by unscrewing and therefore rotation of the container 20 relative to the insert 30.

Figure 3A:
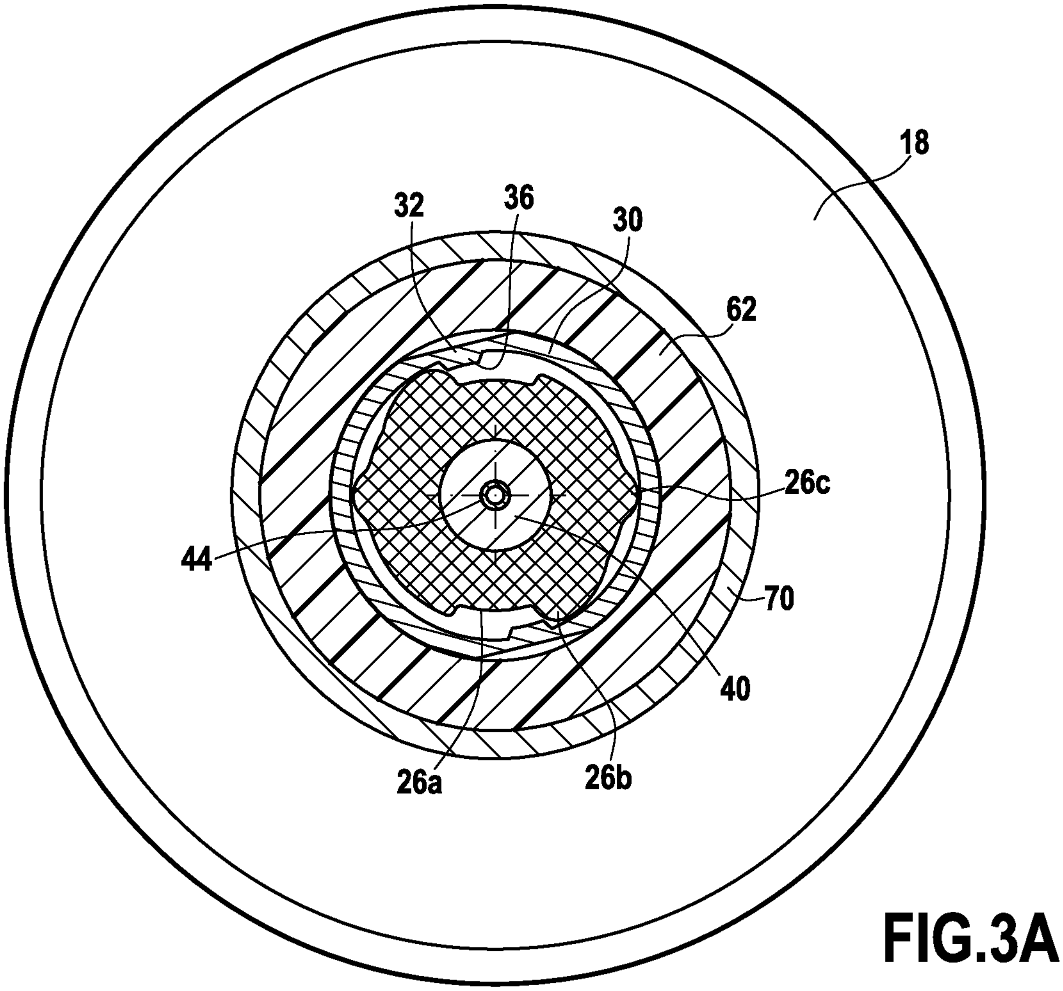
FIG. 3A is a cross-sectional view of the packaging assembly along the plane III-III of FIG. 1, at the start of a movement of dismounting of the insert from the container.

FIG. 3A illustrates the initial position, when the insert 30 is mounted on the container 20. In this position, the gasket 46 is compressed and the sealing of the container 20 ensured. In this position, the notch 36 may be facing a recess 26*a* of the bead 26. The movement of the insert 30 in the clockwise direction is blocked by the thread end stop 24*a*, while the movement in the counterclockwise direction is blocked by the first boss 26*b*.

To initiate the dismounting, a user must rotate the insert 30 in the counterclockwise direction and, to do so, provide an excess of torque (or more generally of force) so that the notch 36 passes the first boss 26*b*. This situation, illustrated in FIG. 3B, corresponds to a first position in which the force required for the dismounting movement reaches a first local maximum. For example, the torque required for passing the first boss in the dismounting direction may be set between 40 Newton (N) and 110 N, preferably equal to 55 N.

Figure 3B:
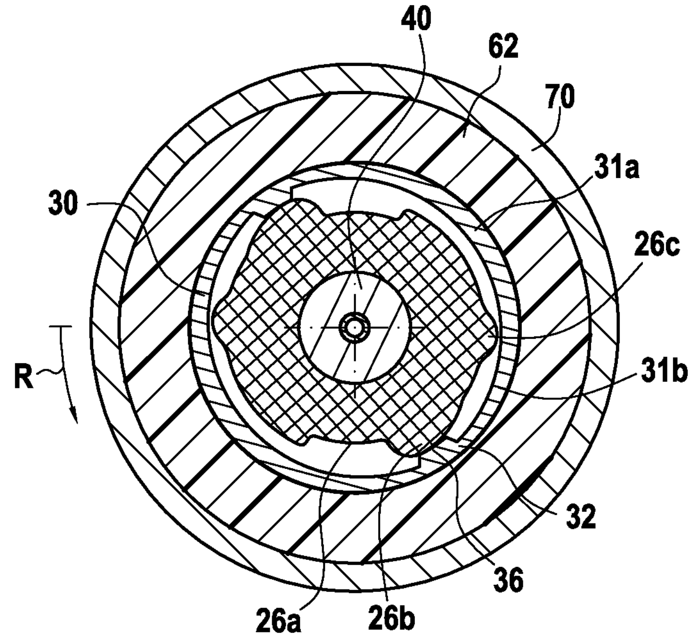
FIG. 3B is a cross-sectional view of the packaging assembly along the plane III-III of FIG. 1, at a later stage than that of FIG. 3A during the movement of dismounting of the insert on the container.

In the first position illustrated in FIG. 3B, the notch 36 cooperates with the first boss 26*b*. The container 20, and more particularly the first boss 26*b*, induces on the insert 30 an elastic deformation. In this case, the radial deformation of the insert 30 is facilitated on the one hand by the presence of the flat 32, which provides space radially outside the insert 30 to accommodate the deformation, and on the other hand by the presence of a portion 31*b* of relatively thinned radial thickness which promotes bending in the area of the insert 30 including the notch 36.

Figure 3C:
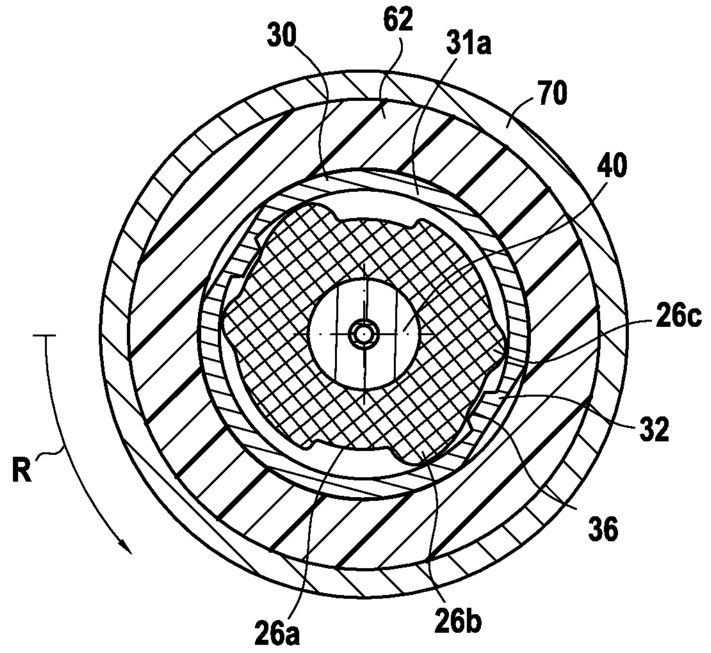
FIG. 3C is a cross-sectional view of the packaging assembly along the plane III-III of FIG. 1, at a later stage than that of FIG. 3B during the movement of dismounting of the insert from the container.

By continuing the rotation of the container 20 in the counterclockwise direction R, the position illustrated in FIG. 3C is passed, in which the notch 36 is located between the two bosses 26*b*, 26*c*. The shape of the first boss 26*b* is not symmetrical: the slope of the first boss 26*b* is gentler on the mounting side (side in the direction of the second boss 26*c*) than on the dismounting side (opposite side on the second boss 26*c*). More generally, the first slope of the first boss 26*b* encountered in the dismounting direction is the steepest of the slopes of the bosses 26*b*, 26*c*. Thanks to these dispositions, the first boss 26*b* provides a sharper hard spot guaranteeing better closing during the mounting, additional difficulty during the dismounting and good compression of the gasket 46.

The radial thickness of the bead 26 between the first boss 26*b* and the second boss 26*c* may be provided sufficiently small to allow the return of the notch 36 to its rest position, as evidenced by the gap between the notch 36 and the bead 26 in FIG. 3C. Thus, when approaching the next boss which involves a new local force maximum, a significant excess of force must be provided by the user.

In the position of FIG. 3C, the gasket 46 may no longer be sufficiently compressed to ensure a closing sealed to the container 20. In other embodiments, the gasket 46 could however be always sufficiently compressed when the notch 36 is between the two bosses 26*b*, 26*c*, or more generally, when the mounting/dismounting movement is between the first position and the second position described below.

By continuing the rotation of the insert 30 in the counterclockwise direction R, it is necessary to again provide an excess of torque (or more generally of force) so that the notch 36 passes the second boss 26*c*. This situation, illustrated in FIG. 3D, corresponds to a second position in which the force required for the dismounting movement reaches a second local maximum. For example, the torque required for passing the second boss in the dismounting direction may be set between 8 N and 25 N, preferably equal to 15 N. It is noted that the values of torques required for passing the first position and the second position may be different (one higher or lower than the other) or identical, and may vary depending on whether a mounting or a dismounting is carried out. Typically, in the mounting direction, the torque required for passing the first boss 26*b* may be set between 2 N and 15 N, preferably equal to 6 N and, independently, the torque required for passing the second boss 26*c* may be set between 30 N and 45 N, preferably equal to 37 N.

Figure 3D:
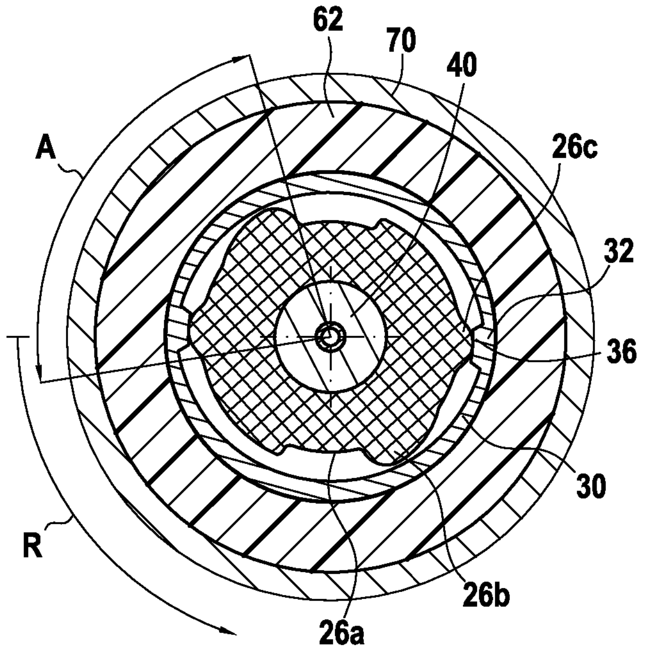
FIG. 3D is a cross-sectional view of the packaging assembly along the plane III-III of FIG. 1, at a later stage than that of FIG. 3C during the movement of dismounting of the insert from the container.

In the second position illustrated in FIG. 3D, the notch 36 cooperates with the second boss 26*c*. The container 20, and more particularly the second boss 26*c*, induces on the insert 30 an elastic deformation similar to the one described with regard to the first position.

As illustrated in FIG. 3D, the first position is located at 90° or less from the second position. More particularly, the circumferentially outer ends of the first boss 26*b* and of the second boss 26*c* may be separated from each other by an angle A about the axis X, the angle A being less than or equal to 90°. Alternatively or additionally, the shape of the bosses 26*b*, 26*c* may be provided so as not to include any undercut part in the angular sector of angle A. In this way, the manufacture of the bead 26, for example during the molding of the container 20, is facilitated.

Figure 3E:
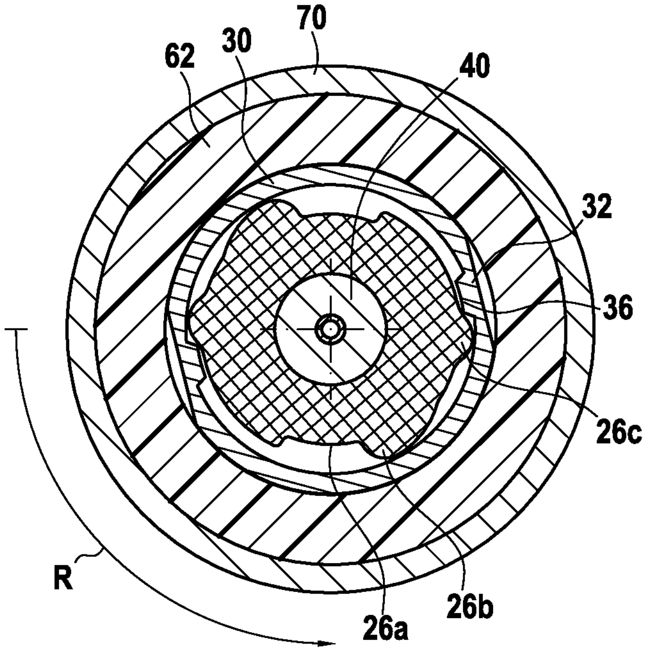
FIG. 3E is a cross-sectional view of the packaging assembly along the plane III-III of FIG. 1, at a later stage than that of FIG. 3D during the movement of dismounting of the insert from the container.

By continuing the rotation of the insert 30 in the counterclockwise direction R, the position illustrated in FIG. 3E is passed, in which the notch 36 is located after the second boss 26*c*. As in the position of FIG. 3C, the insert 30 may return to the rest position. The unscrewing movement can then continue without the notch 36 encountering any obstacle: before arriving again at a first boss 26*b* in the circumferential direction, the insert will have axially shifted sufficiently for the notch 36 not to encounter said boss anymore. Conversely, the pitch of the threading 24 and the axial height of the notch 36 and of the bosses 26*b*, 26*c* are dimensioned so that, between the first position and the second position, the axial displacement of the insert 30 is sufficiently small for the notch 36 to cooperate with said bosses.

The mounting movement occurs through the same steps, in the opposite direction.

Figure 4:
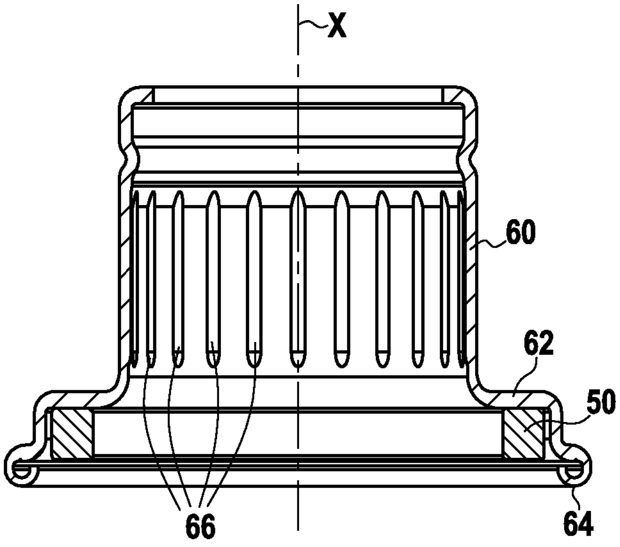
FIG. 4 is a longitudinal sectional view along the plane IV-IV of FIG. 1.

FIG. 4 illustrates, in axial section, the masking hoop 60. The masking hoop 60 has, at one end, a rounded portion 64 able to come into contact with the container 20, in this case the body 18. To do so, in this case, said end is wound on itself, here radially inwardly, in order to form the rounded portion 64. Alternatively, the rounded portion 64 could be formed by a bead devoid of sharp ridge in its part configured to come into contact with the container 20.

The assembly of the masking hoop 60 on the insert 30 may be carried out as follows. On the one hand, the insert 30 carrying the dispensing member 40 is mounted on the container 20, as described previously. The movement of screwing of the insert 30 along the threading 24 being blocked at a certain position thanks to the thread end stop 24*a*, the relative orientation between the insert 30 and the container 20 is predetermined and can be guaranteed when the insert 30 is dismounted and then remounted on the container 20.

On the other hand, the masking hoop 60 is inserted into the cap 70. The relative orientation between the masking hoop 60 and the cap 70 may be ensured by magnetization. In this case, a magnet is housed in the cap 70 and configured to attract a magnet 50 fixedly assembled to the masking hoop 60, typically by bonding. The magnet 50 may be mounted under a flange 62 of the masking hoop 60, as shown in FIG. 4.

The cap 70 and the container 20 may include decorations. To ensure a good relative orientation of these decorations, the cap 70 carrying the masking hoop 60 is aligned relative to the container 20, for example by means of a camera. Once the correct orientation is obtained, the cap 70 carrying the masking hoop 60 is force-fitted onto the insert 30. The masking hoop 60 is configured to ensure a piece-to-piece clamping on the insert 30, which normally cannot be dismounted, by example thanks to axial ribs 66 which bite into the insert 30. The magnetized masking hoop 60 thus being well oriented relative to the container 20, the cap 70 will be automatically oriented appropriately thereafter, whatever the orientation in which it is put back on the container 20.

Although the present description refers to specific exemplary embodiments, modifications can be made to these examples without departing from the general scope of the invention as defined by the claims. For example, although radial cooperation has been described between the bosses 26*b*, 26*c* and the notch 36, it would be possible to envisage axial cooperation, for example with axial notches 36 or axially deformable tabs, and/or bosses provided not on the neck 22 but on the body 18 of the container 20. Furthermore, the number and shape of the notches and bosses may be modified as long as the insert passes successively through a first position in which the force required for said movement reaches a first local maximum, and a second position in which said force reaches a second local maximum.

More generally, individual characteristics of the different embodiments illustrated or mentioned can be combined in additional embodiments. Accordingly, the description and drawings should be considered in an illustrative rather than restrictive sense.

The invention claimed is:

1. A packaging assembly for a cosmetic product, comprising a container able to contain said product, and an insert carrying a dispensing member and dismountably mounted and remounted on the container to allow, when the insert is mounted on the container, dispensing of the product by the dispensing member, wherein a movement of mounting and/or dismounting of the insert on/from the container comprises a rotation of the insert relative to the container and the insert is configured to cooperate with the container so that during each of the movements of mounting and dismounting of the insert on/from the container, the insert passes successively through a first position in which a force required for said movement reaches a first local maximum, and a second position in which said force reaches a second local maximum.

2. The packaging assembly according to claim 1, wherein one element among the insert and the container induces on another element among the insert and the container an elastic deformation when passing the first position and the second position.

3. The packaging assembly according to claim 1, wherein, in the first position, a notch of the insert cooperates with a boss of the container, and in the second position, said notch or another notch of the insert cooperates with said boss or another boss of the container.

4. The packaging assembly according to claim 3, wherein the container comprises a threading for the mounting of the insert, the boss or bosses being provided on an annular bead located on one side of the threading.

5. The packaging assembly according to claim 3, wherein the insert has a tubular wall from which the notch projects, the wall having a reference thickness on a portion relatively away from the notch and a thinned thickness compared to the reference thickness on a portion relatively close to the notch.

6. The packaging assembly according to claim 3, wherein the insert has an annular shape including a flat from which the notch projects.

7. The packaging assembly according to claim 1, wherein the container has a neck defining an opening and the insert is configured to be mounted on the neck of the container.

8. The packaging assembly according to claim 1, wherein the first position is located at 90° or less from the second position.

9. The packaging assembly according to claim 1, further comprising a masking hoop assembled to the insert.

10. The packaging assembly according to claim 9, wherein the masking hoop having, at one end, a rounded portion configured to come into contact with the container.

11. The packaging assembly according to claim 1, further comprising a gasket configured to be compressed during mounting of the insert on the container.

12. A packaging assembly for a cosmetic product, comprising a container able to contain said product, and an insert carrying a dispensing member and dismountably mounted on the container to allow, when the insert is mounted on the container, dispensing of the product by the dispensing member, wherein a movement of mounting and/or dismounting of the insert on/from the container comprises a rotation of the insert relative to the container and the insert is configured to cooperate with the container so that during each of the movements of mounting and dismounting of the insert on/from the container;

and further comprising a masking hoop assembled to the insert, wherein the masking hoop has, at one end, a rounded portion configured to come into contact with the container.

* * * * *